United States Patent
Yoshimura et al.

(10) Patent No.: US 10,790,649 B2
(45) Date of Patent: Sep. 29, 2020

(54) REMOVING APPARATUS AND METHOD

(71) Applicant: HONDA MOTOR CO., LTD., Tokyo (JP)

(72) Inventors: Takuro Yoshimura, Tochigi (JP); Kotaro Yoshida, Tochigi (JP); Ryuzo Sakamoto, Tochigi (JP); Masafumi Saito, Tochigi (JP); Keisuke Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 16/199,462

(22) Filed: Nov. 26, 2018

(65) Prior Publication Data
US 2019/0165555 A1  May 30, 2019

(30) Foreign Application Priority Data
Nov. 29, 2017  (JP) .................. 2017-229554

(51) Int. Cl.
| | |
|---|---|
| *H02G 1/12* | (2006.01) |
| *H02B 15/00* | (2006.01) |
| *H01B 15/00* | (2006.01) |

(52) U.S. Cl.
CPC ............ *H02G 1/126* (2013.01); *H02G 1/127* (2013.01); *H01B 15/006* (2013.01); *H02G 1/1295* (2013.01); *H02G 1/1297* (2013.01)

(58) Field of Classification Search
CPC ...... H02G 1/12; H02G 1/1202; H02G 1/1248; H02G 1/1265; H02G 1/1268; H02G 1/126; H02G 1/127
USPC .................................................. 83/917, 947
See application file for complete search history.

(56) References Cited

U.S. PATENT DOCUMENTS

| | | | | |
|---|---|---|---|---|
| 3,462,052 A | * | 8/1969 | Wagner .................. | B26D 3/001 225/2 |
| 3,719,007 A | * | 3/1973 | Bevard .................... | B24D 5/04 451/544 |
| 4,195,045 A | * | 3/1980 | Mead ....................... | G02B 6/25 264/1.25 |

(Continued)

FOREIGN PATENT DOCUMENTS

| | | |
|---|---|---|
| CN | 103683124 | 3/2014 |
| JP | 2013-211939 | 10/2013 |
| JP | 2014-188619 | 10/2014 |

OTHER PUBLICATIONS

Chinese Office Action dated Dec. 25, 2019, 10 pages.

*Primary Examiner* — Andrea L Wellington
*Assistant Examiner* — Richard D Crosby, Jr.
(74) *Attorney, Agent, or Firm* — Rankin, Hill & Clark LLP (57) ABSTRACT

A removing apparatus (2) includes a first removing section (11) and a second removing section (12). The first removing section (11) includes a rotating disk (15) and a driven roller (16). The rotating disk (15) has a pair of left and right first to fourth left and right removing blades (21) to (24) attached thereto. When the rotating disk (15) rotates in a counterclockwise direction, a coil conductive wire (3) sandwiched between the rotating disk (15) and the driven roller (16) is transferred in a transfer direction. When the rotating disk (15) rotates in a counterclockwise direction, the left and right side surface portions of the insulating coating (4) are removed by a blade portion (21b) of a pair of left and right first left and right removing blades (21).

8 Claims, 10 Drawing Sheets (56) References Cited

U.S. PATENT DOCUMENTS

| | | | | |
|---|---|---|---|---|
| 4,538,487 | A | 9/1985 | Hatfield et al. | |
| 4,741,104 | A * | 5/1988 | Noon | B26D 3/001 |
| | | | | 30/90.4 |
| 5,074,169 | A * | 12/1991 | Matz | H02G 1/127 |
| | | | | 81/9.51 |
| 5,203,237 | A * | 4/1993 | Cross | H02G 1/127 |
| | | | | 30/351 |
| 5,481,638 | A * | 1/1996 | Roll | G02B 6/245 |
| | | | | 30/279.2 |
| 5,865,085 | A * | 2/1999 | Vollenweider | H01B 15/006 |
| | | | | 81/9.51 |
| 5,924,200 | A * | 7/1999 | College | H02G 1/127 |
| | | | | 30/90.1 |
| 6,094,821 | A * | 8/2000 | College | H02G 1/127 |
| | | | | 30/90.1 |
| 6,640,602 | B2 * | 11/2003 | Estes | B21D 28/28 |
| | | | | 72/326 |
| 9,230,717 | B1 * | 1/2016 | Manna | H02G 1/1297 |
| 2007/0234858 | A1 * | 10/2007 | Sullivan | H02G 1/1295 |
| | | | | 83/13 |
| 2009/0151167 | A1 * | 6/2009 | Lu | H02G 1/1217 |
| | | | | 30/90.8 |
| 2013/0309406 | A1 * | 11/2013 | Yokota | H02G 1/126 |
| | | | | 427/356 |
| 2016/0322792 | A1 * | 11/2016 | Dober | H02G 1/1253 |
| 2018/0083428 | A1 * | 3/2018 | Shigematsu | H01B 15/006 |
| 2019/0165555 | A1 * | 5/2019 | Yoshimura | H02G 1/126 |

* cited by examiner

REMOVING APPARATUS AND METHOD

BACKGROUND OF THE INVENTION

Field of the Invention

The present invention relates to a removing apparatus and a method of removing an insulating coating from a rectangular conductive wire.

Description of the Related Art

There has been known a removing apparatus which removes an insulating coating from a conductor having a conductive wire and the insulating coating covering the conductive wire (for example, see Japanese Patent Laid-Open No. 2013-211939).

According to the removing apparatus disclosed in Japanese Patent Laid-Open No. 2013-211939, a first step removes mutually facing two surfaces of the insulating coating from a conductor having four surfaces by a removal mold, and a second step removes the remaining mutually facing two surfaces of the insulating coating of the conductor by another removal mold.

The removing apparatus disclosed in Japanese Patent Laid-Open No. 2013-211939, however, involves a problem in that when the conductor is transferred and the insulating coating is removed during the transfer step of the conductor, the transfer of the conductor needs to be stopped to perform the first step and the second step, and then, after removal, the conductor is transferred to the next step, thereby increasing the number of steps by such stopping step.

In view of the above circumstances, the present invention has been made, and an object of the present invention is to provide a removing apparatus and a method, which can suppress an increase in the number of steps.

SUMMARY OF THE INVENTION

The removing apparatus of the present invention is a removing apparatus which removes an insulating coating from a rectangular conductive wire of a conductor, the conductor having the rectangular conductive wire with a rectangular shape and the insulating coating covering the rectangular conductive wire, the removing apparatus comprising: a transfer unit configured to transfer the conductor in a predetermined direction; and a removing unit which has a removing blade which is displaceable so as to remove the insulating coating on a removal target side surface of the conductor from the rectangular conductive wire, the removing unit being configured to displace the removing blade while the transfer unit is transferring the conductor, thereby to remove the insulating coating on the removal target side surface from the rectangular conductive wire.

According to the removing apparatus of the present invention, the removing unit removes the insulating coating while the transfer unit is transferring the conductor, and thus can reduce the number of steps (operation time), compared with an apparatus which removes the insulating coating while the conductor is stationary.

In addition, it is preferable that the removing blade is displaceable in an inclination direction inclined with respect to a perpendicular direction perpendicular to the predetermined direction in a plane parallel to the removal target side surface, and the removing unit displaces the removing blade in the inclination direction so as to abut against the insulating coating on the removal target side surface.

This configuration can further reduce the load on the conductor and can reduce the size of the removing apparatus, compared with a configuration of displacing a pair of removing blades in the perpendicular direction to abut against the insulating coating.

Further, it is preferable that the removing unit comprises a rotating disk, the rotating disk provided with the removing blade, the rotating disk being rotatable and being rotated to displace the removing blade in the inclination direction so as to abut against the insulating coating on the removal target side surface, and by rotating the rotating disk to rotate the removing blade, the insulating coating on the removal target side surface is removed from the rectangular conductive wire by the removing blade.

This configuration can easily remove the insulating coating by rotation of the rotating disk.

Further, it is preferable that the rotating disk transfers the conductor in the predetermined direction with an outer peripheral surface of the rotating disk abutting against a surface other than the removal target side surface of the rectangular conductive wire.

According to this configuration, the conductor can be transferred by the rotating disk constituting the removing unit. Thus, this configuration can reduce the number of parts and the size of the removing apparatus compared with a configuration of providing a transfer member for transferring the conductor separately from the removing unit. Further, this configuration can transfer the conductor by the rotating disk, and thus can suppress the difference between a transfer speed of the conductor and a removing speed by a pair of removing blades disposed on the rotating disk, compared with a configuration of transferring the conductor by a member different from the rotating disk.

Further, it is preferable that the transfer unit is disposed separately from the removing unit, and comprises a transfer member which transfers the conductor.

According to this configuration, the conductor can be reliably transferred by the transfer member. Further, the transfer speed of the conductor by the transfer member can be set different from the removing speed by a pair of removing blades disposed on the rotating disk. Thus, for example, when the removing speed is set slower than the transfer speed, this configuration can increase the removal range by the pair of removing blades compared with a configuration in which the removing speed is the same as the transfer speed.

Further, it is preferable that the removing unit displaces the removing blade in the inclination direction in a direction along the predetermined direction so as to abut against the insulating coating on the removal target side surface. It should be noted that the direction along the predetermined direction refers to a direction of moving in the predetermined direction when displaced, and also includes a direction not parallel to the predetermined direction.

This configuration can reduce the load on the conductor and can cleanly remove the insulating coating, compared with a configuration in which the removing blade is displaced in a direction along a direction opposing the predetermined direction to abut against the removal target side surface.

Further, it is preferable that the removing blade comprises a blade portion which has a cutting edge for removing the insulating coating and overlaps the insulating coating in a plane parallel to the removal target side surface when displaced in the inclination direction, wherein the leading end of a blade portion is recessed in a direction opposite to the predetermined direction from a direction orthogonal to the inclination direction on the leading end of the cutting edge when the leading end of the cutting edge is displaced in the inclination direction to abut against the insulating coating, and a trailing end of the blade portion is recessed in the predetermined direction from the direction orthogonal to the inclination direction on the trailing end of the cutting edge when the leading end of the cutting edge is displaced in the inclination direction to abut against the insulating coating.

This configuration can remove the insulating coating more cleanly than a configuration in which the leading end and the trailing end of the blade portion are not recessed as described above (formed to be projected).

The removal method of the present invention is a removal method of removing an insulating coating from a rectangular conductive wire of a conductor with a rectangular shape, the conductor having the rectangular conductive wire with a rectangular shape and the insulating coating covering the rectangular conductive wire, the removal method comprising: a transfer step of transferring the conductor in a predetermined direction; and a removal step of removing the insulating coating on a removal target side surface from the rectangular conductive wire by displacing a removing blade which is displaceable so as to remove the insulating coating on the removal target side surface of the conductor from the rectangular conductive wire while the conductor is being transferred in the transfer step.

According to the removal method of the present invention, the insulating coating is removed in a state in which the conductor is being transferred in the transfer step. Thus, this configuration can reduce the number of steps compared with a configuration of removing the insulating coating in a state the conductor is stopped.

DETAILED DESCRIPTION OF THE PREFERRED EMBODIMENTS

Hereinafter, embodiments of the present invention will be described with reference to the accompanying drawings.

Figure 1:
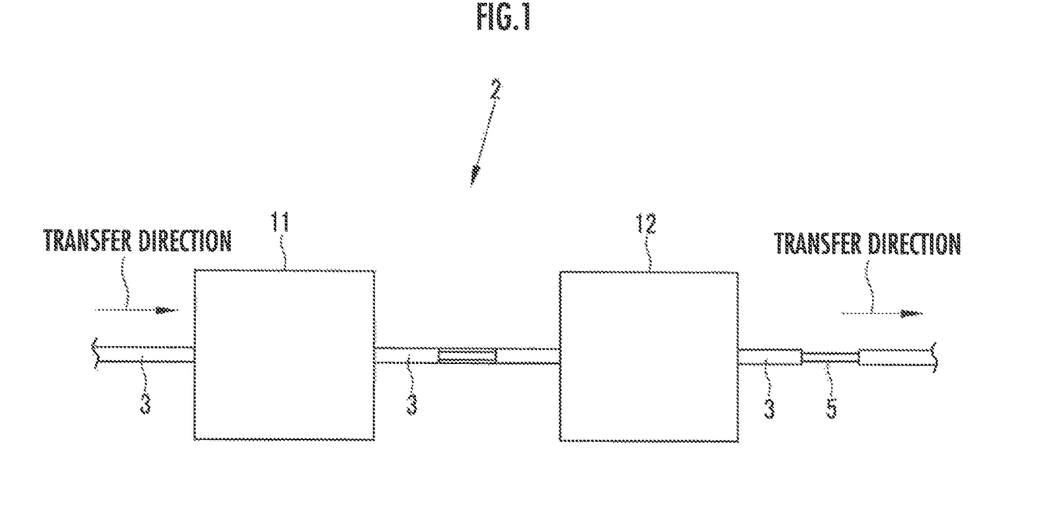
FIG. 1 is a schematic side view illustrating a removing apparatus.
Figure 2:
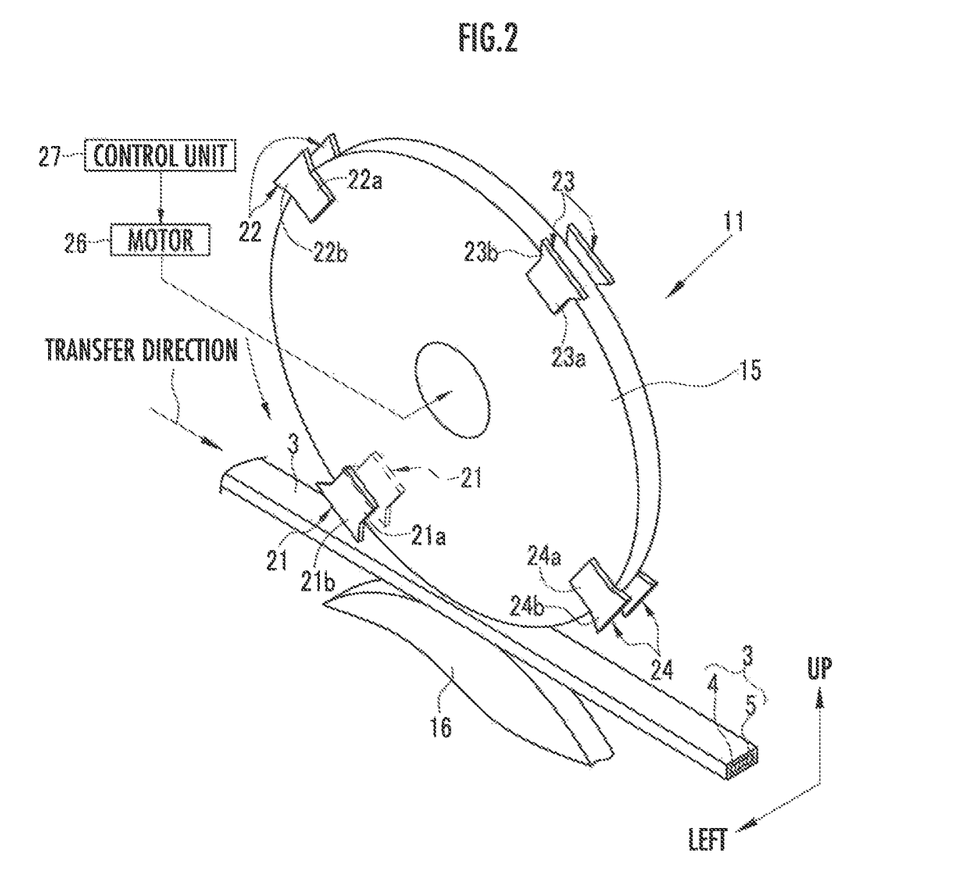
FIG. 2 is a perspective view illustrating a first removing section and a coil conductive wire.

As illustrated in FIGS. 1 and 2, a removing apparatus 2 removes left and right side surface portions and upper and lower side surface portions of an insulating coating 4 from a rectangular conductive wire 5 while transferring a coil conductive wire 3 (conductor) in which the rectangular conductive wire 5 with a rectangular shape is covered with the insulating coating 4.

According to the present embodiment, the insulating coating 4 is formed to have a rectangular outer shape and the coil conductive wire 3 also has a rectangular outer shape.

The coil conductive wire 3 with the insulating coating 4 removed therefrom is cut and used, for example, for a stator coil as a coil segment. Note that the rectangular shape includes a shape with rounded corners.

The removing apparatus 2 comprises a first removing section 11 which removes a left side surface portion and a right side surface portion of the insulating coating 4; and a second removing section 12 which removes an upper side surface portion and a lower side surface portion of the insulating coating 4.

The first removing section 11 comprises a rotatable rotating disk 15; and a driven roller 16, wherein the coil conductive wire 3 is sandwiched between the rotating disk 15 and the driven roller 16.

The left and right side surfaces of the rotating disk 15 include thereon a pair of left and right first to fourth left and right removing blades 21 to 24 for removing the left side surface portion and the right side surface portion of the insulating coating 4, wherein the removing blades are arranged at a pitch of 90°. In the present embodiment, the rotating disk 15 having the first to fourth left and right removing blades 21 to 24 disposed thereon serves as a removing unit which removes the insulating coating 4 from the rectangular conductive wire 5. Note that the number of left and right removing blades may be changed as needed and may be arranged at a different pitch (for example, 75°, 105°, 75°, and 105°). Note also that the first to fourth left and right removing blades 21 to 24 may be formed integrally with the rotating disk 15.

Further, the removing apparatus 2 comprises a motor 26 which rotates the rotating disk 15; and a control unit 27 which controls driving of the motor 26.

When the control unit 27 drives the motor 26, the rotating disk 15 rotates. In the present embodiment, the control unit 27 drives the motor 26 so that the rotating disk 15 rotates in a counterclockwise direction.

When the rotating disk 15 rotates in the counterclockwise direction, the coil conductive wire 3 sandwiched between the driven roller 16 and the rotating disk 15 is transferred in a transfer direction (predetermined direction). Thus, the rotational speed of the rotating disk 15 is the same as the transfer speed of the coil conductive wire 3. Note that when the coil conductive wire 3 is transferred, the driven roller 16 rotates in a clockwise direction. In the present embodiment, a transfer unit which transfers the coil conductive wire 3 in the predetermined direction comprises the rotating disk 15, the driven roller 16, and the motor 26.

The first left and right removing blades 21 comprise a rectangular attachment portion 21a attached to the rotating disk 15; and a trapezoidal blade portion 21b disposed at a leading end of the attachment portion 21a. The blade portion 21b comprises a cutting edge 21c (see FIG. 3) sharpened so as to be able to remove the insulating coating 4 and projects outwardly in a radial direction of the rotating disk 15.

The second to fourth left and right removing blades 22 to 24 comprise attachment portions 22a to 24a and blade portions 22b to 24b and are formed to have the same shapes as those of the first left and right removing blades 21. Thus, the detailed description is omitted.

Figure 3:
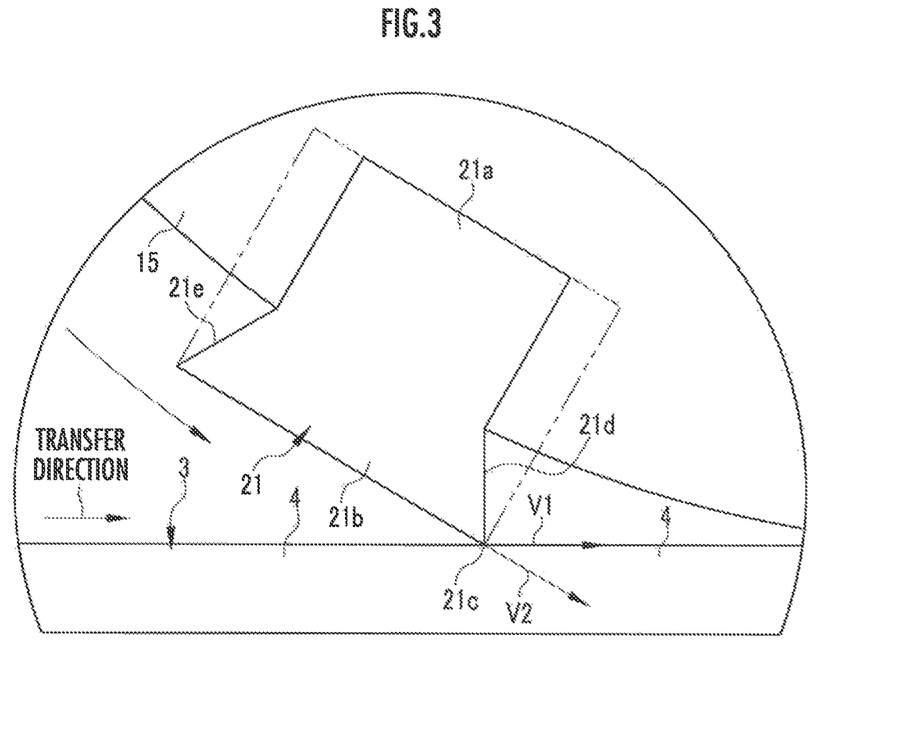
FIG. 3 is a side view illustrating a state in which a blade portion of first left and right removing blades abuts against an upper surface of the insulating coating of the coil conductive wire.

As illustrated in FIG. 3, when the rotating disk 15 rotates in the counterclockwise direction, the blade portion 21b of the first left and right removing blades 21 abuts against the insulating coating 4. As detailed later, when the rotating disk 15 further rotates in the counterclockwise direction, the insulating coating 4 is removed by the blade portion 21b.

In the present embodiment, the first to fourth left and right removing blades 21 to 24 are displaced in an inclination direction (a direction inclined with respect to a perpendicular direction perpendicular to the transfer direction) in a direction along the transfer direction (predetermined direction) and abut against the insulating coating 4.

When the blade portion 21b abuts against the insulating coating 4, the blade portion 21b is formed so that a front inclined surface 21d on a trapezoidal front side is perpendicular to an abutment surface (an upper surface in FIG. 3) of the insulating coating 4. A rear inclined surface 21e on the rear side of the blade portion 21b is formed to be front-rear symmetrical with the front inclined surface 21d.

Figure 4:
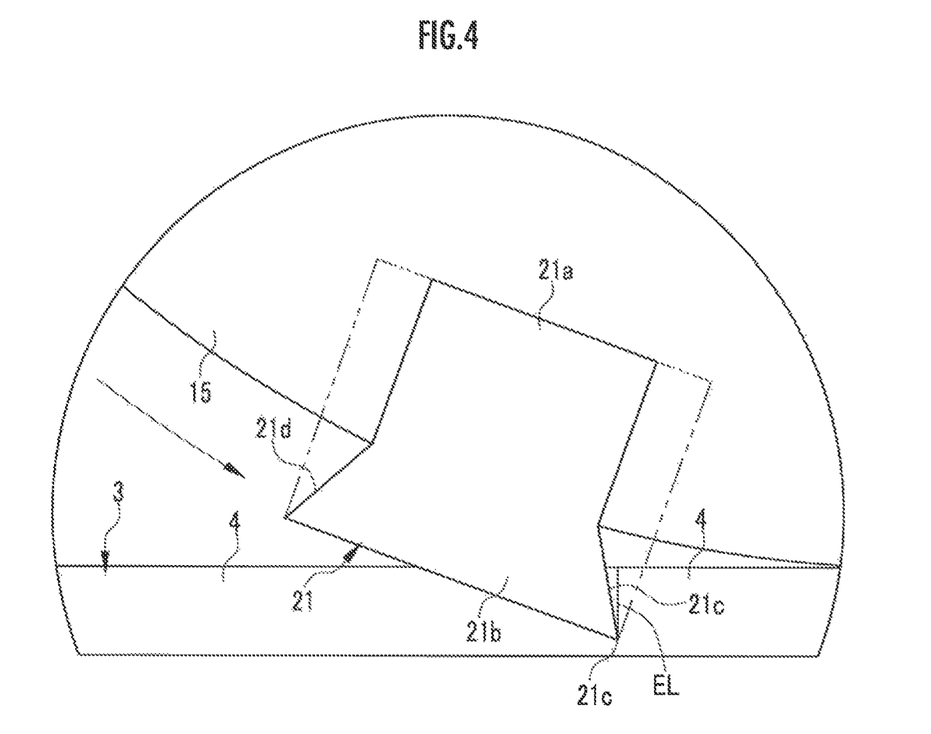
FIG. 4 is a side view illustrating a first state in which the blade portion of the first left and right removing blades removes the insulating coating of the coil conductive wire.

Note that a two-dot chain line in FIGS. 3 and 4 is an imaginary line indicating that the blade portion 21b is formed to be rectangular. Note also that it is sufficient as long as the front inclined surface 21d does not project in the transfer direction from the perpendicular direction perpendicular to the upper surface of the insulating coating 4.

As illustrated in FIG. 4, when the rotating disk 15 further rotates in the counterclockwise direction from the state illustrated in FIG. 3, the front inclined surface 21d enters a state of being inclined opposite to the transfer direction with respect to the perpendicular direction (an upward direction in FIG. 4).

In FIG. 4, when the blade portion 21b is formed rectangular (indicated by the two-dot chain lines), a side surface of the blade portion 21b abuts against a removal line EL removed by the cutting edge 21c of the blade portion 21b, the insulating coating 4 of the abutted portion is crushed. Thus, the insulating coating 4 cannot be cleanly removed.

In the present embodiment, the front inclined surface 21d of the blade portion 21b does not abut against the removal line EL removed by the leading end of the cutting edge 21c of the blade portion 21b. Thus, the present embodiment can more cleanly remove the insulating coating 4 than an embodiment in which the side surface of the blade portion 21b abuts against the removal line EL (indicated by the two-dot chain lines in FIG. 4).

Likewise, the rear inclined surface 21e of the blade portion 21b does not abut against the removal line removed by a trailing end of the cutting edge 21c of the blade portion 21b. Thus, the present embodiment can more cleanly remove the insulating coating 4 than an embodiment in which the side surface of the blade portion 21b abuts against the removal line (indicated by the two-dot chain lines in FIG. 4).

It should be noted that it is preferable that (first condition) when the leading end of the cutting edge 21c abuts against the insulating coating 4, the front inclined surface 21d of the blade portion 21b is recessed in a direction opposite to the transfer direction from a direction orthogonal to the inclination direction in the leading end of the cutting edge 21c (indicated by the two-dot chain lines in FIG. 3).

It should also be noted that it is preferable that (second condition) when the leading end of the cutting edge 21c abuts against the insulating coating 4, the rear inclined surface 21e of the blade portion 21b is recessed in the transfer direction from a direction orthogonal to the inclination direction in the trailing end of the cutting edge 21c (indicated by the two-dot chain lines in FIG. 3). The shape of the blade portion 21b may be changed as needed as long as the shape satisfies the first and second conditions.

It should also be noted that the blade portion 21b may be formed rectangular as indicated by the two-dot chain lines in FIGS. 3 and 4. In this case, the insulating coating 4 can also be removed. The shape of the first to fourth left and right removing blades 21 to 24 and the later-described first to fourth upper and lower removing blades 31 to 34 may be changed as needed.

The present embodiment is configured such that the inner product between a vector V1 (right direction in FIG. 3) in the transfer direction (predetermined direction) of the coil conductive wire 3 and a vector V2 in an abutting direction (inclination direction) of the blade portion 21b when the blade portion 21b abuts against the insulating coating 4 is positive. Thus, the present embodiment can reduce the load on the blade portion 21b when the insulating coating 4 is removed, compared with an embodiment where the inner product is negative.

Note that a positive inner product between the vector V1 and the vector V2 means that an angle between the vector V1 and the vector V2 exceeds 0 and is less than 90°. For example, if the abutting direction (inclination direction) of the blade portion 21b in FIG. 3 is a left obliquely downward direction, the angle between the vector V1 and the vector V2 exceeds 90° and is less than 180°, and thus the inner product is negative.

Note that the blade portion 21b may be displaced so that the inner product is negative. For example, the insulating coating 4 may be removed by rotating the rotating disk 15 in a clockwise direction.

The rotating disk 15 is formed such that its horizontal width (thickness of the rotating disk 15) is less than that of the coil conductive wire 3 and is the same as that of the rectangular conductive wire 5. Likewise, the driven roller 16 is also formed such that its horizontal width is less than that of the coil conductive wire 3 and is the same as that of the rectangular conductive wire 5. Thus, the first to fourth left and right removing blades 21 to 24 can remove the insulating coating 4 without contacting the driven roller 16.

Figure 5:
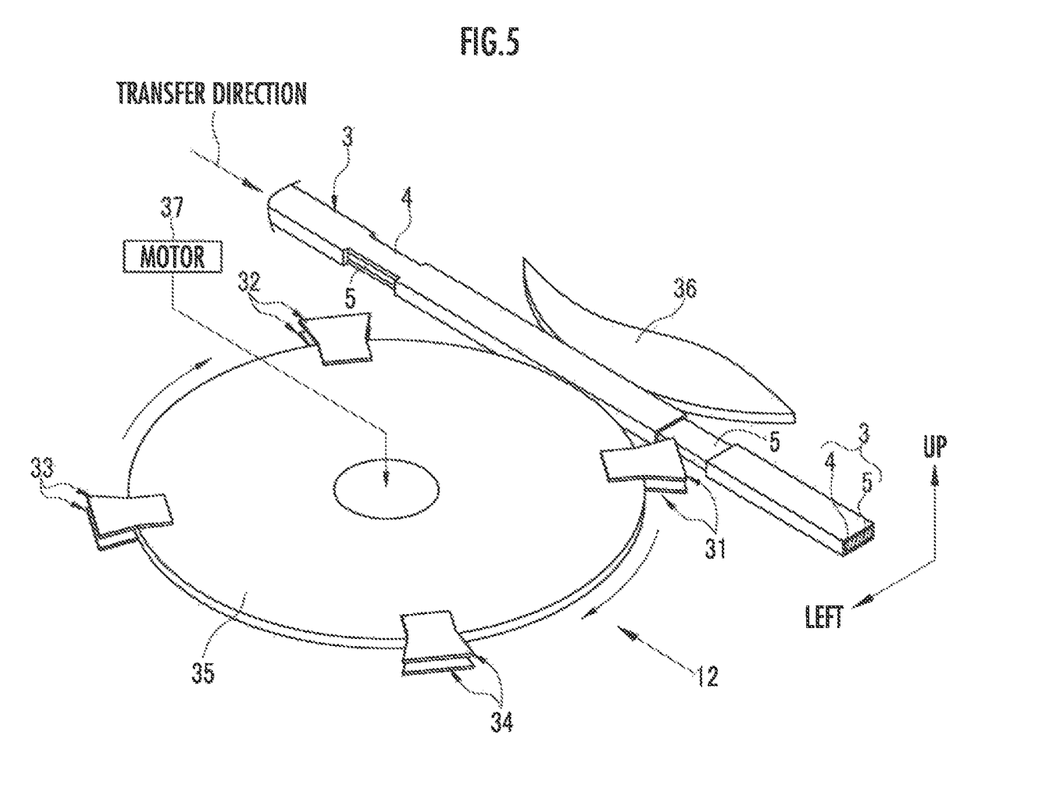
FIG. 5 is a perspective view illustrating a second removing section and the coil conductive wire.

As illustrated in FIG. 5, like the first removing section 11, the second removing section 12 comprises a rotating disk 35 which includes thereon the pair of upper and lower first to fourth upper and lower removing blades 31 to 34 for removing the upper side surface portion and the lower side surface portion of the insulating coating 4, wherein the removing blades are arranged at a pitch of 90°; a driven roller 36 arranged such that the coil conductive wire 3 is sandwiched between the driven roller 36 and the rotating disk 35; and a motor 37 which rotates the rotating disk 35.

The first to fourth upper and lower removing blades 31 to 34, the rotating disk 35, and the driven roller 36 are configured to be different in size and direction, but configured to be the same as the first to fourth left and right removing blades 21 to 24, the rotating disk 15, and the driven roller 16 in the first removing section 11. Thus, the detailed description is simplified. The control unit 27 controls driving of the motor 37. In the present embodiment, the transfer unit which transfers the coil conductive wire 3 in a predetermined direction comprises the rotating disk 35, the driven roller 36, and the motor 37. Note that in the present embodiment, the rotating disk 35 which includes thereon the first to fourth upper and lower removing blades 31 to 34 also serves as the removing unit which removes the insulating coating 4 from the rectangular conductive wire 5.

The second removing section 12 is set to remove the upper and lower side surface portions of the insulating coating 4 of the portion whose left side surface portion and right side surface portion are removed by the first removing section 11.

[Insulating Coating Removal]

When the removing apparatus 2 removes the left and right side surface portions and the upper and lower side surface portions of the insulating coating 4, the control unit 27 drives the motor 26 to rotate the rotating disk 15 in a counterclockwise direction and transfer the coil conductive wire 3 sandwiched between the rotating disk 15 and the driven roller 16 in the transfer direction (transfer step).

Figure 6:
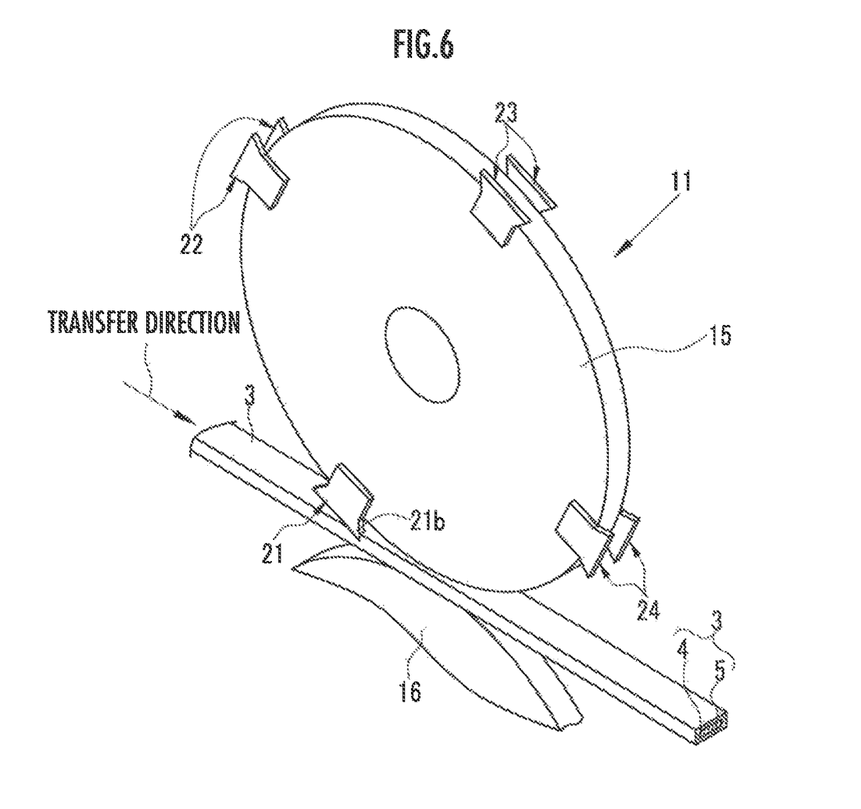
FIG. 6 is a perspective view illustrating the first state in which the blade portion of the first left and right removing blades removes the insulating coating of the coil conductive wire.

As illustrated in FIG. 6, when the rotating disk 15 rotates in the counterclockwise direction, the blade portion 21b of the pair of left and right first left and right removing blades 21 penetrates the left and right side surface portions of the insulating coating 4 (removal step).

Figure 7:
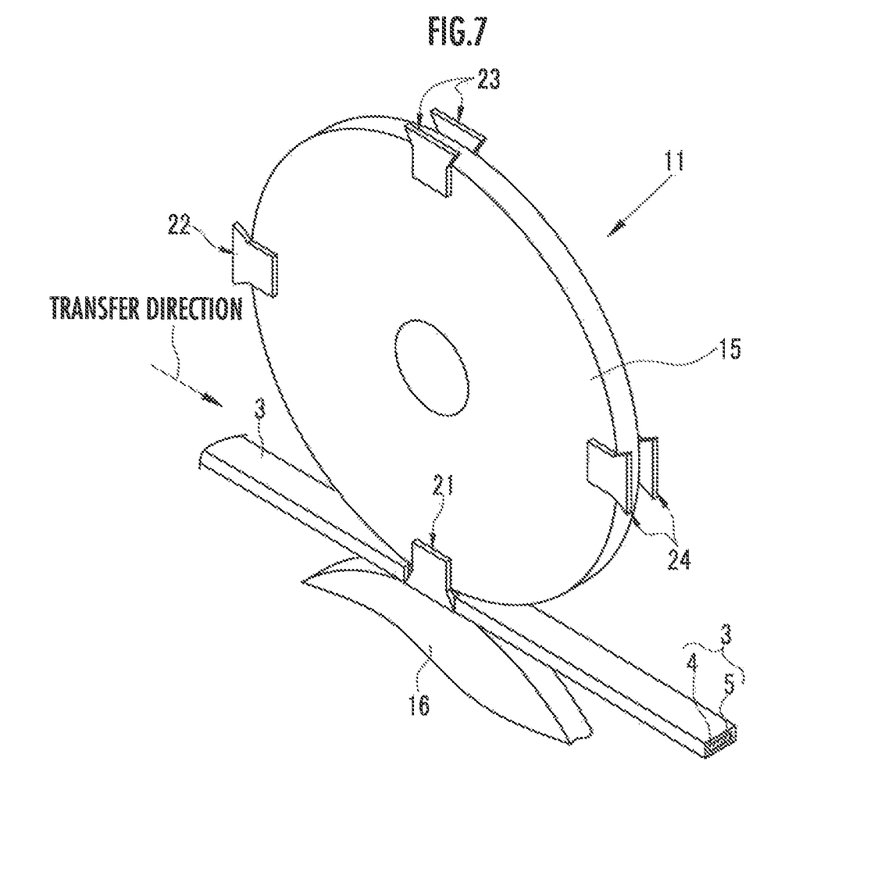
FIG. 7 is a perspective view illustrating a second state in which the blade portion of the first left and right removing blades removes the insulating coating of the coil conductive wire.

When the rotating disk 15 rotates in the counterclockwise direction until the state illustrated in FIG. 7 is entered, the left and tight side surface portions of the insulating coating 4 are removed by the blade portion 21b of the pair of left and right first left and right removing blades 21 (removal step).

When the left and right side surface portions of the insulating coating 4 are removed by the blade portion 21b of the pair of left and right first left and right removing blades 21, the lower surface of the coil conductive wire 3 is supported by the driven roller 16. Even if a removal force is applied to the insulating coating 4 by the blade portion 21b of the pair of left and right first left and right removing blades 21, the coil conductive wire 3 does not move downward, thereby allowing the insulating coating 4 to be reliably removed.

Figure 8:
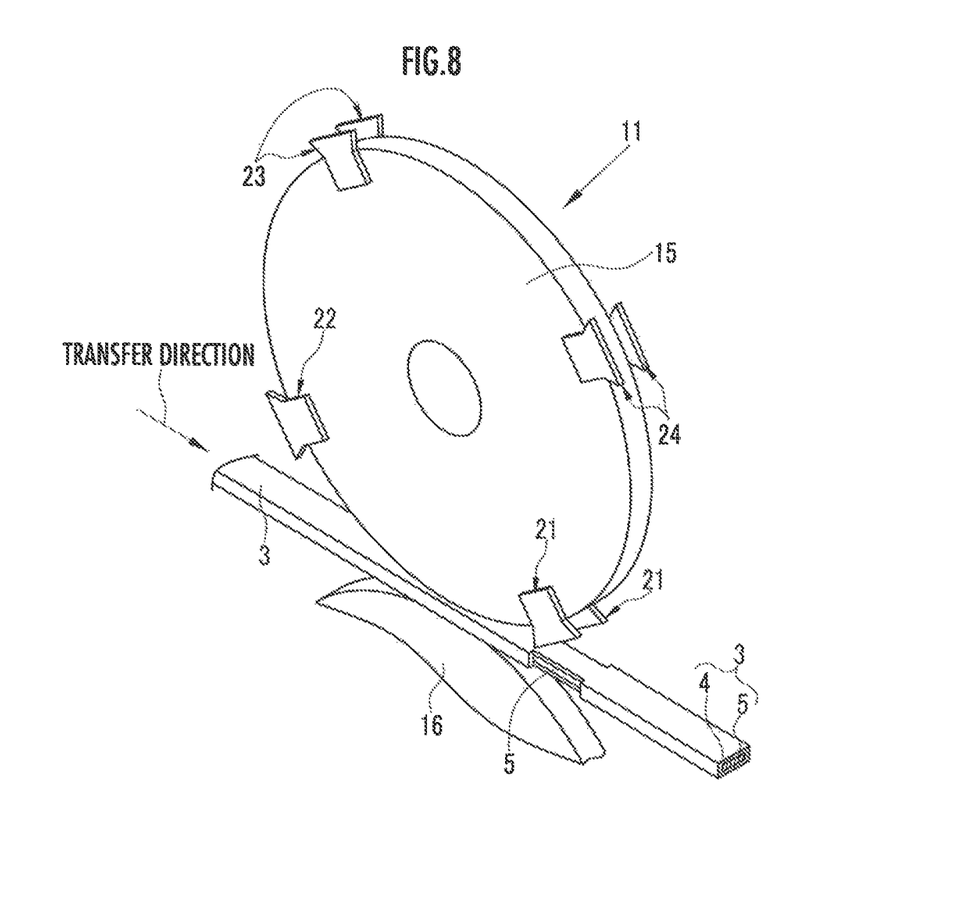
FIG. 8 is a perspective view illustrating a third state in which the blade portion of the first left and right removing blades removes the insulating coating of the coil conductive wire.

As illustrated in FIG. 8, when the left and right side surface portions of the insulating coating 4 are removed by the blade portion 21b of the pair of left and right first left and right removing blades 21 and then the rotating disk 15 further rotates in the counterclockwise direction, the pair of left and right first left and right removing blades 21 separates from the coil conductive wire 3.

In the present embodiment, the first to fourth left and right removing blades 21 to 24 are displaced in the inclination direction in a direction along the transfer direction to abut against the insulating coating 4. Thus, the present embodiment can reduce the load on the blade portions 21b to 24b when removing the insulating coating 4, compared with an embodiment in which the first to fourth left and right removing blades 21 to 24 are displaced in the inclination direction along a direction opposing the transfer direction to abut against the insulating coating 4.

When the left and right side surface portions of the insulating coating 4 of the coil conductive wire 3 is removed in the first removing section 11, the coil conductive wire 3 is transferred to the second removing section 12.

As illustrated in FIG. 5, in the second removing section 12, the control unit 27 drives the motor 37 to cause the rotating disk 35 to rotate in the clockwise direction. When the rotating disk 35 rotates in the clockwise direction, the upper and lower side surface portions of the insulating coating 4 are removed by the pair of left and right first upper and lower removing blades 31.

As illustrated in FIG. 1, the coil conductive wire 3 transferred from the second removing section 12 enters a state in which the left and right side surface portions and the upper and lower side surface portions of the insulating coating 4 are removed and enters a state in which the rectangular conductive wire 5 is exposed. This exposed portion of the rectangular conductive wire 5 is cut and used as a coil segment.

In the first removing section 11, the left and right side surface portions of the insulating coating 4 are removed by the first left and right removing blades 21 followed by the second left and right removing blades 22, the third left and right removing blades 23, and the fourth left and right removing blades 24 according to the rotation of the rotating disk 15. Likewise, in the second removing section 12, the upper and lower side surface portions of the insulating coating 4 are removed by the first upper and lower removing blades 31, followed by the second upper and lower removing blades 32, the third upper and lower removing blades 33, and the fourth upper and lower removing blades 34. By repeating this process, the left and right side surface portions and the upper and lower side surface portions of the insulating coating 4 are removed at a predetermined pitch (interval between the first left and right removing blades 21 and the second left and right removing blades 22).

The present embodiment removes the insulating coating 4 while transferring the coil conductive wire 3, and thus can reduce an increase in the number of steps (operation time), compared with an embodiment in which the insulating coating 4 is removed while the coil conductive wire 3 is stationary.

Further, in the present embodiment, as illustrated in FIG. 3, when the blade portion 21b of the first left and right removing blades 21 abuts against the insulating coating 4, the blade portion 21b abuts from a direction inclined with respect to a direction orthogonal to the abutment surface (upper surface) of the insulating coating 4. Thus, the present embodiment can reduce the load on the coil conductive wire 3 at the time of removal and can further reduce the size of the removing apparatus 2, compared with an embodiment in which the blades abut against the abutment surface from a direction orthogonal to the abutment surface of the insulating coating 4.

Note that in the above embodiment, the coil conductive wire 3 is transferred by the rotation of the rotating disk 15, but a mechanism for transferring the coil conductive wire 3 may be provided. For example, an embodiment may be configured to comprise a winding roller which winds the coil conductive wire 3 after removal and a motor which rotates the winding roller, wherein the coil conductive wire 3 is transferred by driving the motor to rotate the winding roller. In this case, it is preferable that, like the driven roller 16, a support member (for example, a roller) for supporting the lower surface of the coil conductive wire 3 may be provided so as to prevent the coil conductive wire 3 from moving when the insulating coating 4 is removed.

Note also that in the above embodiment, the first to fourth left and right removing blades 21 to 24 are rotated on a plane parallel to a removal target side surface (for example, left and right side surfaces) of the insulating coating 4, but without being limited to this, the insulating coating 4 may be removed by rotating the removing blades on a plane (for example, a plane orthogonal to the removal target side surface of the insulating coating 4) inclined with respect to the removal target side surface.

Alternatively, the first to fourth left and right removing blades 21 to 24 may be displaced by a cam mechanism. In this case, the first to fourth left and right removing blades 21 to 24 can be displaced with a more complicated path than rotation.

Further, in the above embodiment, the first removing section 11 and the second removing section 12 are provided, but only one of them may be provided. Further, even if both the first removing section 11 and the second removing section 12 are provided, another embodiment may be configured such that only one of them may be used to grasp the coil conductive wire 3 between the rotating disk and the driven roller.

Further, in the above embodiment, the insulating coating 4 is removed by the first to fourth left and right removing blades 21 to 24 attached to the rotating disk 15 and rotated, but any member may be used as long as the member can remove the insulating coating 4 while transferring the coil conductive wire 3.

For example, like a second embodiment illustrated in FIGS. 9A to 9D, a pair of left and right two removal molds 41, which are movable in upward and downward directions and forward and backward directions (the transfer direction and a direction opposite to the transfer direction) and whose leading end portions include thereon removing blades, may be used for removal. In the second embodiment, the rotating disk 15 is not provided and an unillustrated transfer member (for example, a winding roller which winds the coil conductive wire 3) which transfers the coil conductive wire 3 is provided separately from the removal molds 41.

Figure 9A:
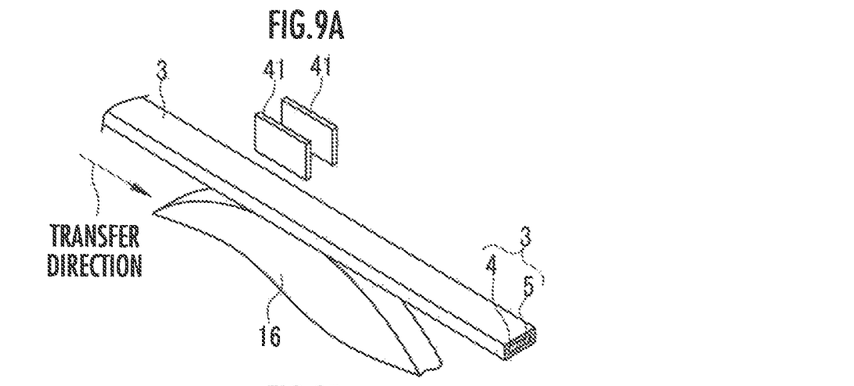
FIG. 9A is a perspective view illustrating a state in which removal molds of a second embodiment are located above the coil conductive wire and remove the insulating coating by vertically movable removing blades.
Figure 9B:
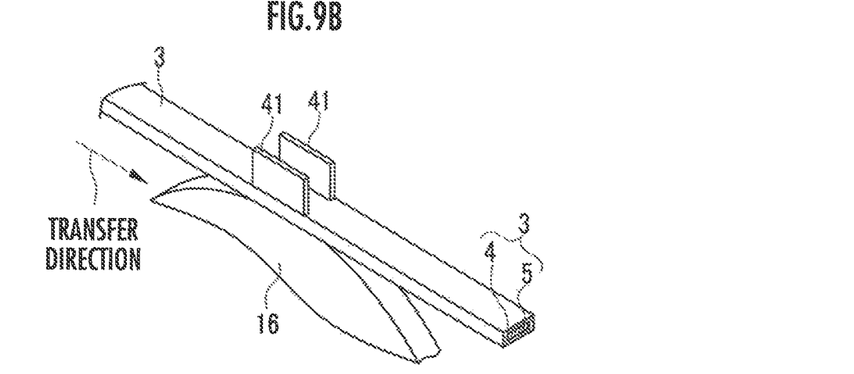
FIG. 9B is a perspective view illustrating a state in which the removal molds of the second embodiment abut against the upper surface of the coil conductive wire.

As illustrated in FIG. 9A, the two removal molds 41 are located at an initial position above the coil conductive wire 3. When the insulating coating 4 is to be removed, the two removal molds 41 are moved to a removal start position illustrated in FIG. 9B by driving a moving mechanism (unillustrated) for moving the two removal molds 41 in the upward and downward directions and in the forward and backward directions.

Figure 9C:
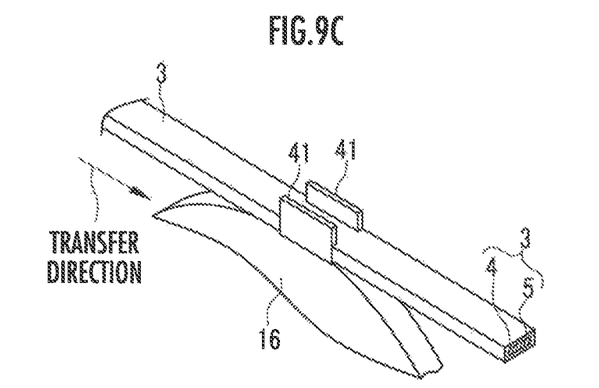
FIG. 9C is a perspective view illustrating a state in which the removal molds of the second embodiment remove the insulating coating of the coil conductive wire.

Then, as illustrated in FIG. 9C, the moving mechanism is driven to move the two removal molds 41 downward while moving in the transfer direction at the same speed as the transfer speed of the coil conductive wire 3 (synchronizing the transfer of the coil conductive wire 3 and the movement of the two removal molds 41 in the transfer direction).

Figure 9D:
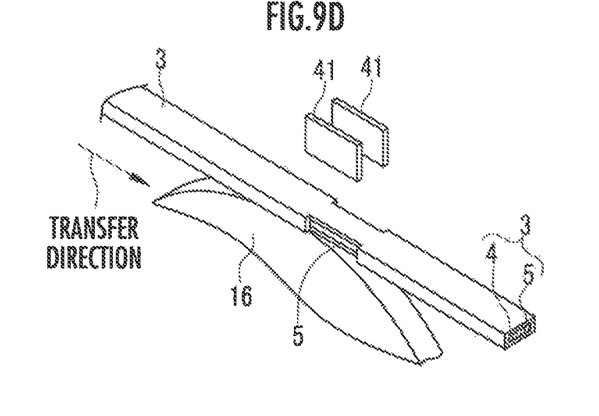
FIG. 9D is a perspective view illustrating a state in which the removal molds of the second embodiment remove the insulating coating of the coil conductive wire and then retract upward.

Then, as illustrated in FIG. 9D, the moving mechanism is driven to move the two removal molds 41 upward to be retracted while moving in the transfer direction at the same speed as the transfer speed of the coil conductive wire 3. Thus, the coil conductive wire 3 enters a state in which the left and right side surface portions of the insulating coating 4 are removed. Finally, the moving mechanism returns the two removal molds 41 to the initial position (see FIG. 9A).

It should be noted that in the above embodiment, a pair of left and right or upper and lower removal target side surfaces are removed by a pair of removing blades, but one removal target side surface may be removed by one removing blade.

Further, the shape of the coil conductive wire 3 may be changed as needed and may be of a circular shape, an elliptical shape, a rectangular shape, or the like, as long as the shape of the rectangular conductive wire 5 is rectangular.

What is claimed is:

1. A removing apparatus which removes an insulating coating from a rectangular conductive wire of a conductor, the conductor having the rectangular conductive wire with a rectangular shape and the insulating coating covering the rectangular conductive wire, the removing apparatus comprising:
   a transfer unit configured to transfer the conductor in a predetermined direction; and
   a removing unit which has a removing blade which is displaceable so as to remove the insulating coating on a removal target side surface of the conductor from the rectangular conductive wire, the removing unit being configured to displace the removing blade while the transfer unit is transferring the conductor without stopping the transfer of the conductor by the transfer unit, to remove the insulating coating on the removal target side surface from the rectangular conductive wire with an interval of a predetermined pitch in the predetermined direction between removed sections of the insulating coating.

2. The removing apparatus according to claim 1, wherein the removing blade is displaceable in an inclination direction inclined with respect to a perpendicular direction perpendicular to the predetermined direction in a plane parallel to the removal target side surface, and
   the removing unit displaces the removing blade in the inclination direction so as to abut against the insulating coating on the removal target side surface.

3. The removing apparatus according to claim 2, wherein the removing unit comprises a rotating disk, the rotating disk provided with the removing blade, the rotating disk being rotatable and being rotated to displace the removing blade in the inclination direction so as to abut against the insulating coating on the removal target side surface, and
   by rotating the rotating disk to rotate the removing blade, the insulating coating on the removal target side surface is removed from the rectangular conductive wire by the removing blade.

4. The removing apparatus according to claim 3, wherein the rotating disk transfers the conductor in the predetermined direction with an outer peripheral surface of the rotating disk abutting against a surface other than the removal target side surface of the rectangular conductive wire.

5. The removing apparatus according to claim 2, wherein the transfer unit is disposed separately from the removing unit, and comprises a transfer member which transfers the conductor.

6. The removing apparatus according to claim 2, wherein the removing unit displaces the removing blade in the inclination direction in a direction along the predetermined direction so as to abut against the insulating coating on the removal target side surface.

7. The removing apparatus according to claim 6, wherein the removing blade comprises a blade portion which has
   a cutting edge for removing the insulating coating and overlaps the insulating coating in a plane parallel to the removal target side surface when displaced in the inclination direction, wherein
   a leading end of the blade portion is recessed in a direction opposite to the predetermined direction from a direction orthogonal to the inclination direction on the leading end of the cutting edge when the leading end of the cutting edge is displaced in the inclination direction to abut against the insulating coating, and a trailing end of the blade portion is recessed in the predetermined direction from the direction orthogonal to the inclination direction on the trailing end of the cutting edge when the leading end of the cutting edge is displaced in the inclination direction to abut against the insulating coating.

8. A removal method of removing an insulating coating from a rectangular conductive wire of a conductor with a rectangular shape, the conductor having the rectangular conductive wire with a rectangular shape and the insulating coating covering the rectangular conductive wire, the removal method comprising:

a transfer step of transferring the conductor in a predetermined direction; and a removal step of removing the insulating coating on a removal target side surface from the rectangular conductive wire by displacing a removing blade which is displaceable so as to remove the insulating coating on the removal target side surface of the conductor from the rectangular conductive wire while the conductor is being transferred in the transfer step without stopping the transfer of the conductor to remove the insulating coating on the removal target side surface from the rectangular conductive wire with an interval of a predetermined pitch in the predetermined direction between removed sections of the insulating coating.

* * * * *